(12) United States Patent
Jacobs et al.

(10) Patent No.: US 7,190,951 B2
(45) Date of Patent: *Mar. 13, 2007

(54) DYNAMIC LOADING AND CREATION OF FUNCTIONAL OBJECTS IN A WIRELESS DEVICE

(75) Inventors: Paul E. Jacobs, La Jolla, CA (US); Stephen A. Sprigg, Poway, CA (US)

(73) Assignee: Qualcomm Incorporated, San Diego, CA (US)

(*) Notice: Subject to any disclaimer, the term of this patent is extended or adjusted under 35 U.S.C. 154(b) by 0 days.

This patent is subject to a terminal disclaimer.

(21) Appl. No.: 11/218,878

(22) Filed: Sep. 2, 2005

(65) Prior Publication Data

US 2006/0003811 A1 Jan. 5, 2006

Related U.S. Application Data

(63) Continuation of application No. 10/133,693, filed on Apr. 25, 2002, now Pat. No. 6,941,133.

(60) Provisional application No. 60/292,051, filed on May 18, 2001.

(51) Int. Cl.
*H04M 3/00* (2006.01)

(52) U.S. Cl. ............... 455/418; 455/414.1; 455/419; 709/217

(58) Field of Classification Search .......... 455/418, 455/414.1, 414.2, 414.3, 414.4, 415, 416, 455/417, 419, 566; 709/217
See application file for complete search history.

(56) References Cited

U.S. PATENT DOCUMENTS

| | | | |
|---|---|---|---|
| 6,173,336 B1 * | 1/2001 | Stoeckl et al. | 719/315 |
| 6,418,129 B1 * | 7/2002 | Fingerhut | 370/328 |
| 6,684,082 B1 * | 1/2004 | McClure | 455/552.1 |
| 6,941,133 B2 * | 9/2005 | Jacobs et al. | 455/418 |

* cited by examiner

*Primary Examiner*—Matthew Anderson
*Assistant Examiner*—Shaima Q. Aminzay
(74) *Attorney, Agent, or Firm*—Robert J. O'Connell; James T. Hagler (57) ABSTRACT

A wireless communication device, pre-loaded with static objects, may be operated under user direction to wirelessly download and install dynamic objects. The device includes various initiators, which request execution of an object by submitting a unique Object-ID to an object manager, whereupon the object manager identifies the requested object, its entry point, and object class and then activates the requested object accordingly.

16 Claims, 4 Drawing Sheets

DYNAMIC LOADING AND CREATION OF FUNCTIONAL OBJECTS IN A WIRELESS DEVICE

CROSS-REFERENCE TO RELATED APPLICATIONS

This application is a continuation of U.S. application Ser. No. 10/133,693, filed Apr. 25, 2002, now U.S. Pat. No. 6,941,133 (allowed and issue fee paid), which is based on provisional application Ser. No. 60/292,051, filed May 18, 2001. The contents of each of these applications are hereby incorporated by reference.

BACKGROUND OF THE INVENTION

I. Field of the Invention

The present invention relates to handheld wireless communication devices. More particularly, the invention concerns a wireless communication device with pre-loaded static objects and user-installed dynamic objects. The device includes various initiators, which request execution of an object by submitting a unique object-ID to an object manager, whereupon the object manager identifies the requested object, its entry point, and object class and then activates the requested object.

II. Description of the Related Art

Wireless telephones are more popular today than ever. And, with increasing consumer demand for wireless services, manufacturers have responded to meet that demand and to provide wireless telephones with ever improving compactness and functionality. Longstanding functions of wireless telephones include user-operated menus for setting ring volume/tone, utilizing vibrate mode, storing telephone number in memory, etc. Further, many wireless telephones include built-in programs to perform computing tasks such as voice recognition, video games, diagnostics, network communications, and more.

In addition to these built-in functions, engineers at QUALCOMM Inc. envision that the next generation of wireless phones will offer customers the ability to self-download new programs from remote servers via wireless link, and self-install those programs for local use on that phone. One challenge in this area is designing sufficiently compact, economical, and powerful telephone circuitry that enables its subcomponents to initiate static applications, built-in to the telephone, as well as dynamic applications downloaded by the customer.

SUMMARY OF THE INVENTION

Broadly, the present invention concerns a wireless communication device, pre-loaded with various static objects, and responsive to user direction to wirelessly download and install certain dynamic objects. The device includes various initiators, which request execution of an object by submitting a unique object-ID to an object manager, whereupon the object manager identifies the requested object, its entry point, and object class and then activates the requested object accordingly.

More specifically, the device includes a wireless telephony module with multiple static objects fixed in circuitry of the telephony module. Each static object is associated with a unique Object ID. Each static object has an entry point, which is a preferred address or other starting point for activating the object. The telephony module includes a static object table correlating the Object ID, entry point, and object class of each static object. The object class indicates whether the object is a program, a file to be opened, a network service to be activated, a menu to be displayed, etc.

The telephony module includes multiple object initiators, such as a user interface, one or more drivers, and a master controller, and more if desired. The telephony module also includes an object manager, provided for the purpose of managing the static and dynamic objects. According to one function, the object manager downloads one or more dynamic objects via wireless link under direction of the user. The object manager assigns a unique Object ID to each dynamic object, and also prepares a dynamic object handler to ascertain an entry point and object class for each dynamic object upon demand in the future. According to another function, the object manager oversees activation of the static and dynamic objects. Initially, the object manager receives requests from the object initiators to activate objects. Each request includes an Object ID, uniquely identifying the requested object. Responsive to each request, the object manager references the Object ID against at least one of the dynamic object handler and static object table to identify an entry point for the requested object, and its object class. The object manager then activates the requested object in a manner appropriate to the identified entry point and object class.

The object manager may be configured to consult the dynamic object handler before consulting the static object table, so that dynamic programs associated with an Object ID are found before (and to the exclusion) of any static programs. This enables users to download dynamic objects that effectively replace the static objects, even though the static are still built into circuitry of the telephony module.

The foregoing features may be implemented in a number of different forms. For example, the invention may be implemented to provide a method to manage static and dynamic objects in a wireless communications device. In another embodiment, the invention may be implemented to provide an apparatus such as a wireless communications device or a wireless telephony module therein. In still another embodiment, the invention may be implemented to provide a signal-bearing medium tangibly embodying a program of machine-readable instructions executable by a digital data processing apparatus to manage static and dynamic objects in a wireless communications device. Another embodiment concerns logic circuitry having multiple interconnected electrically conductive elements configured to manage static and dynamic objects in a wireless communications device.

The invention affords its users with a number of distinct advantages. Chiefly, since the invention applies similar treatment to static (built-in) objects and dynamic (user-downloaded) objects, this reduces the complexity of circuitry since the same mechanisms can be used to process and activate static and dynamic objects. Additionally, by comparing requested Object IDs against installed dynamic objects first, and then against static objects only if there are not matches to dynamic objects, the invention permits users to download dynamic objects that effectively replace static objects of the same Object ID. The invention is also beneficial because the Object ID can be flexibly associated with a variety of different objects, such as programs to run, files to open, network associations to make, menus to display, or a variety of other actions to take. The invention also provides a number of other advantages and benefits, which should be apparent from the following description of the invention.

DETAILED DESCRIPTION

The nature, objectives, and advantages of the invention will become more apparent to those skilled in the art after considering the following detailed description in connection with the accompanying drawings.

Hardware Components & Interconnections

Wireless Communications Device

Figure 1A:
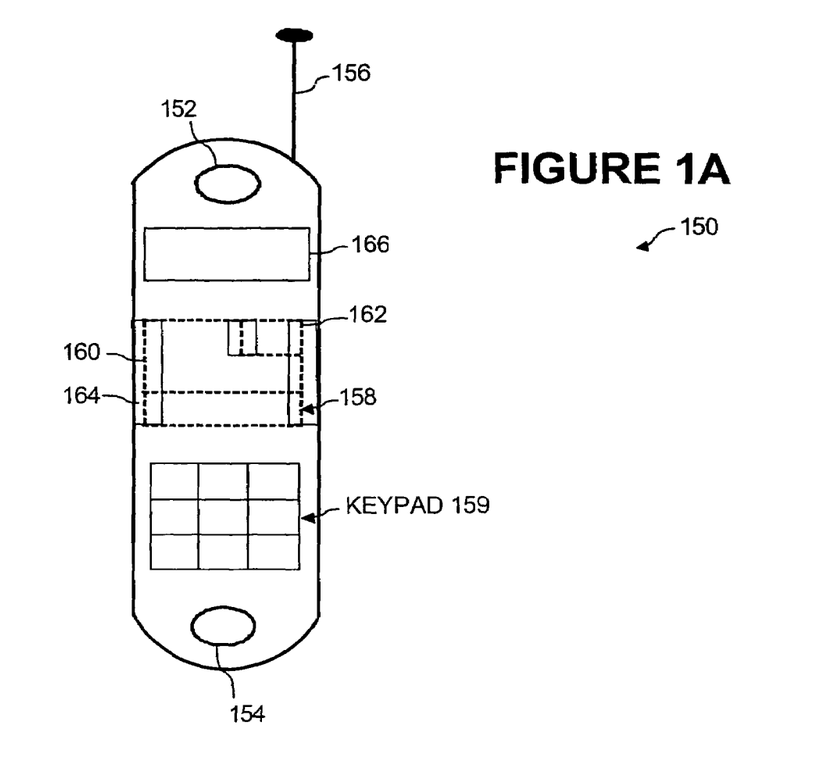
FIG. 1A is a block diagram of a wireless communications device according to the invention.

One aspect of the invention concerns a wireless communications device, which may be embodied by various hardware components and interconnections, with one example being described in by the telephone handset 150 of FIG. 1A. The handset 150 includes a speaker 152, microphone 154, keypad 159, display 166, antenna 156, and handset circuitry 158. The handset circuitry 158 includes portions 160, 164. The portion 160 is configured to conduct two-way wireless communications between a remote party and a user upon the speaker 152 and microphone 154 via a transceiver 162. As one example, the portion 160 may be provided by conventional circuitry of various commercially available wireless telephones.

The portion 164, referred to as a "wireless telephony module," contains static and dynamic objects that may be selectively activated to perform various tasks. The wireless telephony module 164 includes an object manager that responds to requests of various initiators to activate the static and/or dynamic objects. Namely, an initiator submits a unique object-ID to the object manager, whereupon the object manager identifies the requested object, its entry point, and object class and then activates the requested object appropriately.

Wireless Telephony Module

Figure 1B:
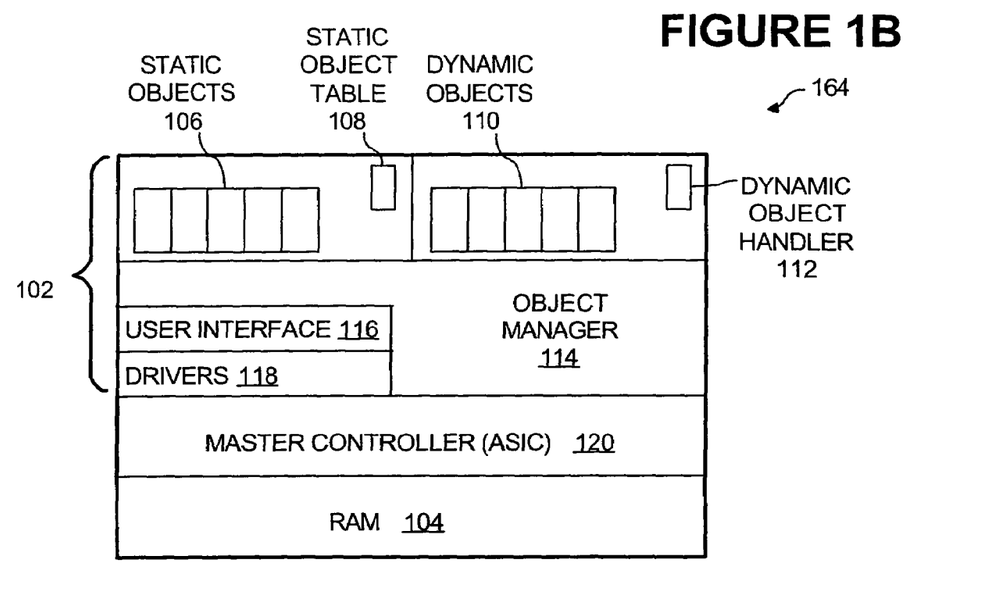
FIG. 1B is a block diagram of the hardware components and interconnections of a wireless telephony module according to the invention.

FIG. 1B shows the wireless telephony module 164 in greater detail. As explained in greater detail below, the module may be provided by logic circuitry, one or more instruction-executing processors, or a combination thereof. In an exemplary embodiment, the module 164 includes a flash-memory image 102, a master controller 120, and random-access memory (RAM) 104. The master controller 120, as illustrated, comprises an application-specific integrated circuit (ASIC).

Considering the module 164 in more detail, and without any intended limitation, the image 102 as illustrated comprises a static image affixed in flash memory. The image 102 includes multiple static objects 106, various dynamic objects 110, an object manager 114, a user interface 116, and various drivers 118. The static objects 106 comprises programs ("functional objects") fixed in circuitry of the module 164, and not subject to change or deletion by the telephone handset user. In other words, the static objects 106 are built-in to the device 150, and available when the device 150 is first powered up. Each static object 106 comprises an action in one of several predetermined "object classes," which define types of actions such as the following: (1) performing a computation, (2) opening a file, (3) activating a network service, such as opening a socket, (4) displaying a menu, (5) performing a computation, or (6) taking other actions that, although not specifically delineated, should be apparent to ordinarily skilled artisans having the benefit of this disclosure. Each static object is associated with a unique Object ID, which in an exemplary embodiment comprises a thirty-two bit binary number. Each static object also has an "entry point," which comprises a predefined point in the static object's program sequence for initiating the static object. To provide an example, an entry point may comprise a storage address in the image 102.

Associated with the static objects 106 is a static object table 108. The table 108 lists the Object ID and entry point of each static object 106. TABLE 1, below, shows an example of the static object table 108. Although the table 108 is illustrated and referred to as a table without any intended limitation, ordinarily skilled artisans will recognize that the table 108 may also be implemented as a linked list or any other useful data structure.

TABLE 1

| OBJECT ID | OBJECT CLASS | ENTRY POINT |
| --- | --- | --- |
| 1111 1111 1111 1111 1111 1111 1111 1111 | COMPUTATIONAL PROGRAM | address 09A7 |
| 1111 1010 1101 0001 1111 1010 1011 1000 | OPEN FILE | address A395 |
| 1001 1101 0111 1101 1000 1001 0110 1011 | OPEN NETWORK FACILITY | address F373 |
| 1111 1111 1111 1111 1111 1111 1111 1111 | DISPLAY MENU | address 882B |
| . . . (more) | . . . (more) | . . . (more) |

The static object table 108 is provided with the module 164 upon manufacture thereof.

Like the static objects 106, the dynamic objects 110 comprise program sequences. However, the dynamic objects 110 are not fixed in circuitry of the module 164. Rather, the dynamic objects 110 are added and deleted by the handset user, as discussed in greater detail below. As with the static objects, each dynamic objects comprises an action in one of the predetermined object classes, each dynamic object is associated with a unique Object ID, and each static object has an entry point comprising a predefined point in the static object's program sequence for initiating the static object.

Associated with the dynamic objects 108 is a dynamic object handler 112. The handler 112 comprises a mechanism for looking up the entry point and object class for a requested dynamic object based upon the dynamic object's Object ID. In one embodiment, the handler 112 may be structured one of the various forms described above in conjunction with the static object table 108 (e.g., table, linked list, etc.).

The image 102 also includes multiple object initiators. The initiators comprise different entities of the module 164 that may have need to call upon the static and dynamic objects 106, 110 to perform a task. The initiators include a user interface 116, one or more drivers 118, a master controller 120, and more if desired. Additionally, there may be one or more remote initiators not located in the module 164 or device 150. For instance, remote initiators may be in wireless communication with the device 150 over a network connection, Internet, telephone connection, or other link.

The user interface 116 comprises a software program that manages the exchange data between an input device operated by the handset user and various components of the module 164 such as the object manager 114, master controller 120, etc. For example, the user interface 116 may manage use and appearance of a menu presented upon the display 166. Depending upon the functionality of the device 150, the drivers 118 comprise software programs that interact with a particular device or software of the handset 150, and contain special knowledge of the device or software interface that programs using the driver do not. The master controller 120 comprises a supreme processing entity that controls all operations of the telephone handset 150. In one embodiment, the master controller 120 comprises an ASIC.

As mentioned above, the image 102 also includes an object manager 114. The manager 114 comprises a processing entity (such as logic circuitry or an executable program) configured to manage the activation of static and dynamic objects 106, 110. Additionally, the object manager 114 manages the user-initiated downloading and removal of dynamic objects 110. Furthermore, as explained in greater detail below, the object manager 114 creates and/or updates the static object table 108 and dynamic object handler 112.

Another component of the module 164 is the RAM 104. The object manager 114 utilizes the RAM 104 when the static and dynamic objects 106, 110 are activated, namely by loading the objects 106, 110 into RAM 104.

Exemplary Digital Data Processing Apparatus

As mentioned above, the objects 106, 110, user interface 116, drivers 118, object manager 114, and master controller 120 may be implemented in various forms, depending upon considerations of compactness, expense, and the like. Depending upon the application, none, some, or all of these features may be implemented by one or more digital data processing apparatus, as exemplified by the hardware components and interconnections of the digital data processing apparatus 200 of FIG. 2.

Figure 2:
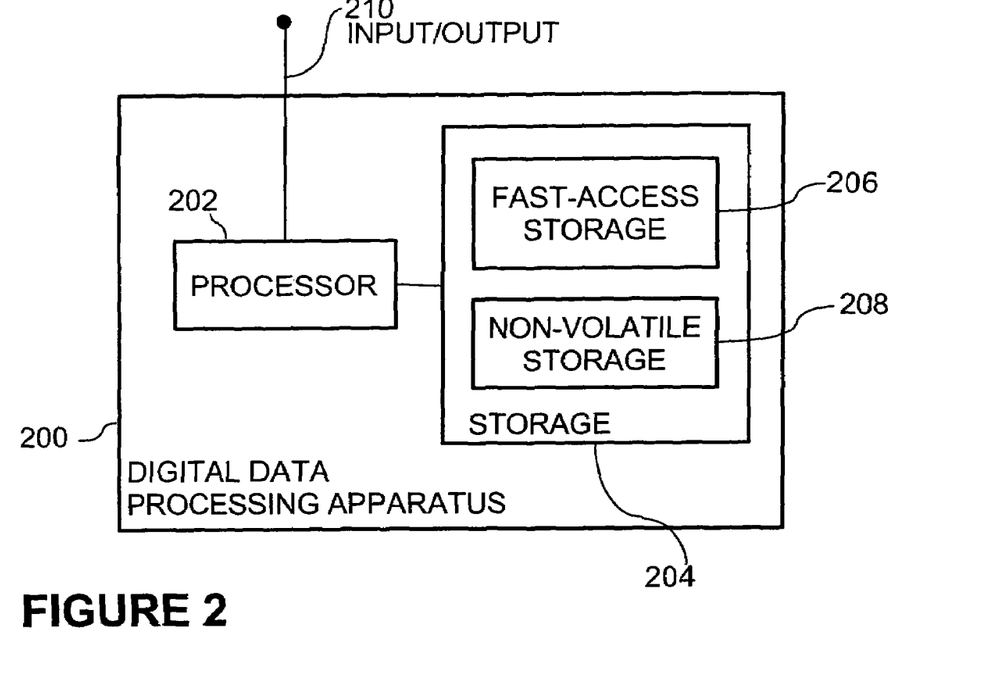
FIG. 2 is a block diagram of a digital data processing apparatus according to the invention.

The apparatus 200 includes a processor 202, such as a microprocessor or other processing machine, coupled to a storage 204. In the present example, the storage 204 includes a fast-access storage 206, as well as nonvolatile storage 208. The fast-access storage 206 may comprise RAM, and may be used to store the programming instructions executed by the processor 202. The nonvolatile storage 208 may comprise, for example, one or more magnetic data storage disks such as a "hard drive," a tape drive, or any other suitable storage device. The apparatus 200 also includes an input/output 210, such as a line, bus, cable, electromagnetic link, or other means for the processor 202 to exchange data with other hardware external to the apparatus 200.

Despite the specific foregoing description, ordinarily skilled artisans (having the benefit of this disclosure) will recognize that the apparatus discussed above may be implemented in a machine of different construction, without departing from the scope of the invention. As a specific example, one of the components 206, 208 may be eliminated; furthermore, the storage 204 may be provided onboard the processor 202, or even provided externally to the apparatus 200.

Logic Circuitry

In contrast to the digital data processing apparatus discussed above, a different embodiment of the invention uses logic circuitry instead of computer-executed instructions to implement one or more of the items 106, 110, 114, 116, 118, 120. Depending upon the particular requirements of the application in the areas of speed, expense, tooling costs, and the like, this logic may be implemented by constructing an application-specific integrated circuit ("ASIC") having thousands of tiny integrated transistors. Such an ASIC may be implemented with CMOS, TTL, VLSI, or another suitable construction. Other alternatives include a digital signal processing chip ("DSP"), discrete circuitry (such as resistors, capacitors, diodes, inductors, and transistors), field programmable gate array ("FPGA"), programmable logic array ("PLA"), and the like.

Operation

Having described the structural features of the present invention, the operational aspect of the present invention will now be described. As mentioned above, the operational aspect of the invention generally involves a method for operating a device with pre-loaded static objects and user-installed dynamic objects, where responsive to various initiators requesting execution of an object by submitting a unique object-ID to an object manager, the object manager identifies the requested object, its entry point, and object class and then activates the requested object. Although the present invention has broad applicability to computing devices of all sorts, the specifics of the structure that has been described is best suited for handheld wireless communications device, and the explanation that follows will emphasize such an application of the invention without any intended limitation.

Signal-Bearing Media

Figure 3:
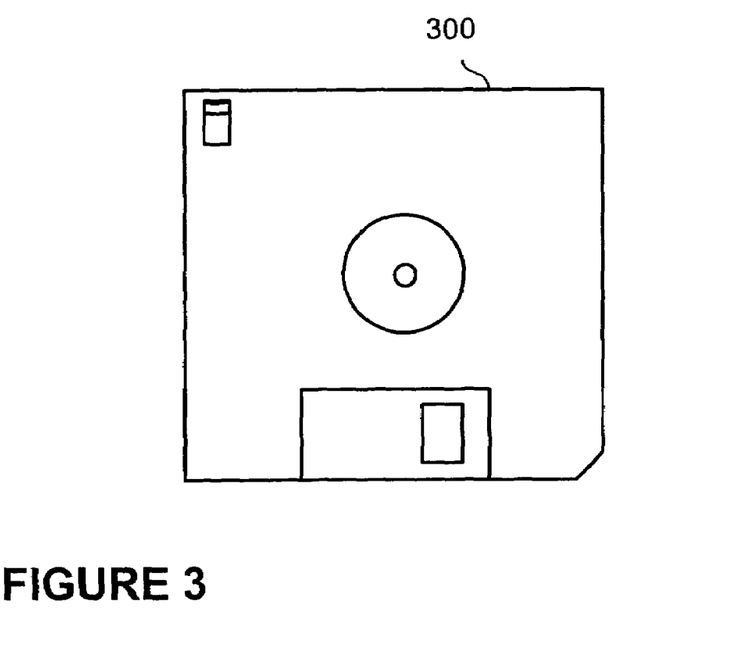
FIG. 3 shows an exemplary signal-bearing medium according to the invention.

In embodiment where one or more of the parts 106, 110, 114, 116, 118, 120 comprise machine-executed program sequences, they may be implemented with various forms of signal-bearing media. In the context of FIG. 2, this signal-bearing media may comprise, for example, the storage 204 or another signal-bearing media, such as a magnetic data storage diskette 300 (FIG. 3), directly or indirectly accessible by a processor 202. Whether contained in the storage 206, diskette 300, or elsewhere, the instructions may be stored on a variety of machine-readable data storage media. Some examples include as direct access storage (e.g., a conventional "hard drive," redundant array of inexpensive disks ("RAID"), or another direct access storage device ("DASD")), serial-access storage such as magnetic or optical tape, electronic read-only memory (e.g., ROM, EPROM, or EEPROM), optical storage (e.g., CD-ROM, WORM, DVD, digital optical tape), paper "punch" cards, or other suitable signal-bearing media including analog or digital transmission media and analog and communication links and wireless. In an illustrative embodiment of the invention, the machine-readable instructions may comprise software object code, compiled from a language such as "C," etc.

Logic Circuitry

In contrast to the signal-bearing medium discussed above, the operational aspect of the invention may be implemented using logic circuitry in addition to (or instead of) using processors to execute instructions. In this embodiment, the logic circuitry is implemented in the one or more of the items 106, 110, 114, 116, 118, 120. The logic circuitry may be implemented using many different types of circuitry, as discussed above.

Overall Sequence of Operation

Figure 4:
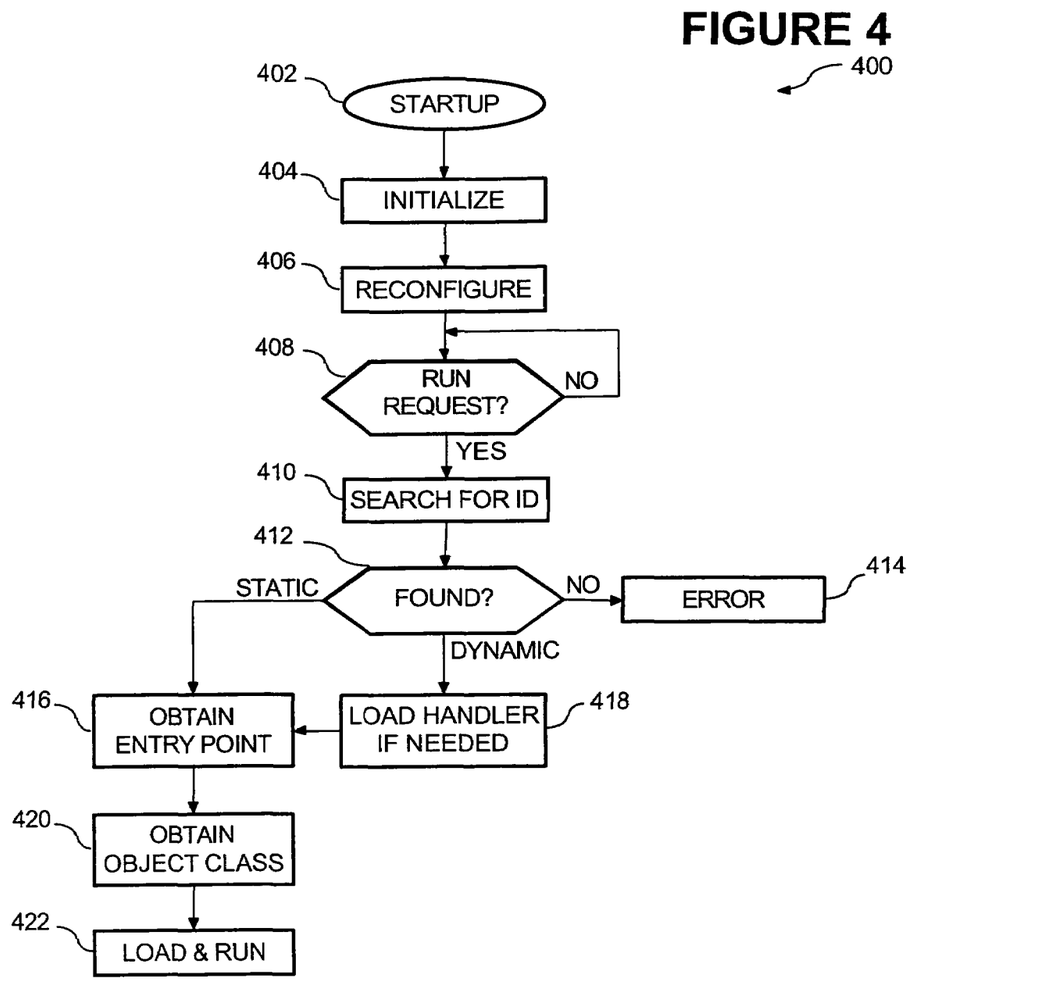
FIG. 4 is a flowchart of an operational sequence for managing static and dynamic objects according to the invention.

FIG. 4 shows a sequence 400 to manage static and dynamic objects, according to one exemplary embodiment of the invention. For ease of explanation, but without any intended limitation, the example of FIG. 4 is described in the context of the components described in FIGS. 1A–1B, 2, 3 described above.

The sequence 400 begins in step 402, for example when the user (not shown) powers-up the device 150. In step 404, the object manager 114 conducts various initialization operations to enable future use of the static and dynamic objects 106, 110. For instance, the object manager 114 constructs the static object table 108 to reflect characteristics of the static objects 106 as shown in TABLE 1, above. Also in step 404, the object manager 114 takes appropriate action to construct, format, generate, or otherwise initialize the dynamic object handler 112, according to the data structure used to implement the handler 112. For instance, the object manager 114 may survey the dynamic objects 110 and then populate the handler 112 with Object IDs, object classes, and entry points of the installed dynamic objects 110.

After step 404, the object manager 114 processes any user requests to download and install dynamic objects. For instance, responsive to a user command entered via keypad 159 of the device 150, the master controller 120 may activate the transceiver 162 to download the requested dynamic object from a remote server. The object manager 114 installs the downloaded object by storing it in the image 102, and also updates the dynamic object handler 112 to recognize the newly downloaded dynamic object. Updating of the dynamic object handler 112 involves assigning a unique Object ID and ascertaining the object's class and entry point. By keypad or other user-initiated command, for example, the object manager 114 may also be invoked to uninstall one or more dynamic objects 110. Step 404 may be repeated at various times after initialization 404, step 404 being shown in the depicted order merely for ease of illustration.

In step 408, the object manager 114 determines whether any object initiator has submitted a request to activate one of the static or dynamic objects 106, 110. Advantageously, each such request need only include thee requested object's Object ID. Moreover, the initiator need not have any knowledge of whether the requested object is static 106 or dynamic 110. When an activation request is received, step 408 advances to step 410, where the object manager 114 determines whether the requested object corresponds to any of the static 106 or dynamic 110 objects. Namely, the object manager 114 consults the handler 112 and static object table 108 to determine whether the requested Object ID is found therein. In one example, the object manager 114 (step 410) first consults the handler 112, thereafter consulting the table 108 only if the requested object is not listed by the handler 112. This arrangement is advantageous because it facilitates updating of a static object by user download of a dynamic object with the identical Object ID—since the handler 112 is consulted first and then the table 108, the outdated static object 108 is effectively ignored.

After step 410, step 412 determines whether the requested Object ID was found in the handler 112 or table 108. If not, the object manager 114 issues an error message 414 to the master controller 120, display 166, or other destination. If the requested Object ID was found by the handler 112, the object manager 114 takes appropriate action to determine the requested object's entry point and object class (step 418). If the handler 112 is implemented as a program, step 418 runs the handler 112 program by loading it into RAM 104. Then, in step 416, the object manager 114 utilizes the handler 112 program (now running) to find the requested object's entry point (step 416) and object class (420). In contrast to the foregoing, if step 412 did not find the requested Object ID in the handler 112, but instead found the Object ID in the static object table 108, then the object manager 114 consults the table 108 to learn the object's entry point (step 416) and object class (step 420).

After step 420, whether performed for a dynamic or static object, the object manager 114 loads the requested object into RAM 104 and takes the appropriate action to execute the object according to its class and entry point (step 422).

Releasing Objects

Figure 5:
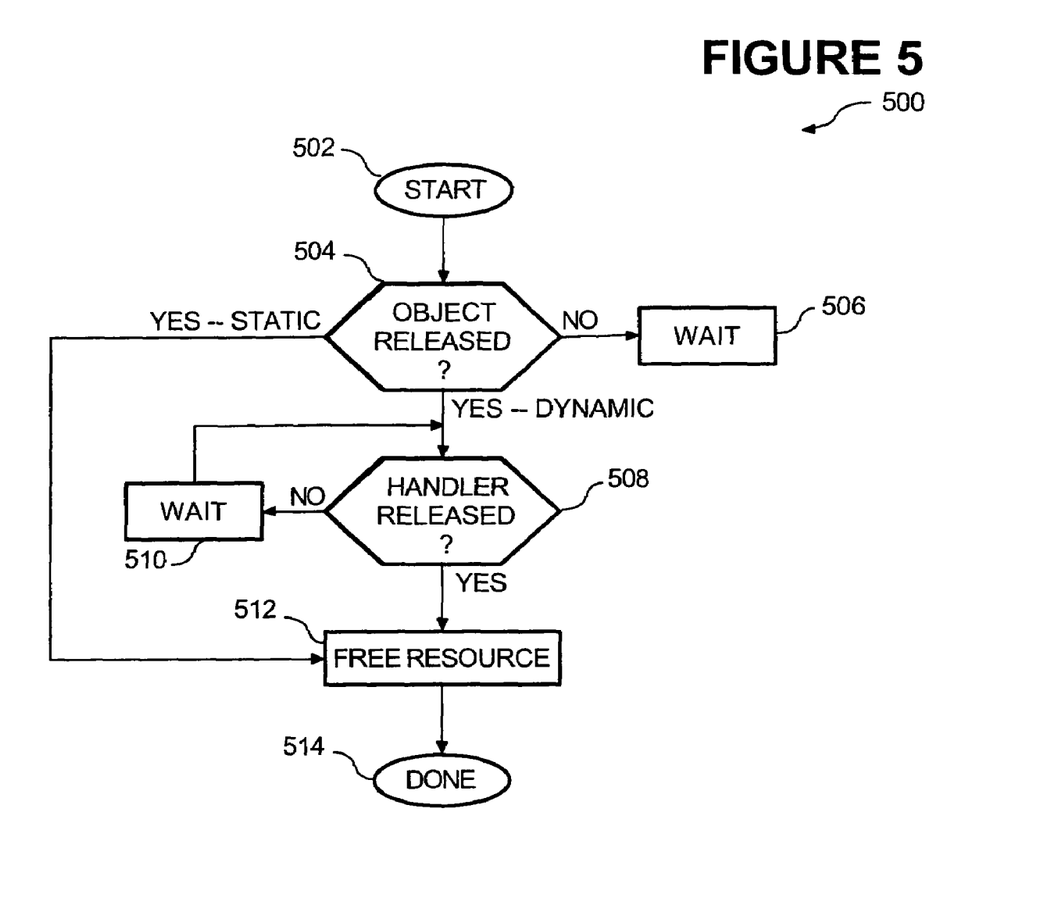
FIG. 5 is a flowchart of an operational sequence for releasing activated objects according to the invention.

FIG. 5 shows a sequence 500, responsive to completion of an object, to free resources encumbered when that object was activated according to FIG. 4. For ease of explanation, but without any intended limitation, the example of FIG. 5 is described in the context of the components described in FIGS. 1A–1B, 2, 3 described above.

The sequence 500 begins in step 502, which is performed repeatedly, such as in response to a periodic timer, non-periodic event, hardware interrupt, or other repeating trigger. The sequence 500 may be performed repeatedly for all objects, or repeatedly performed for each object that has been activated. In the present discussion, step 500 is performed for each activated object, referred to as the "current" object. In step 504, the object manager 114 determines whether the current object has been released. Release of an object may be determined based on various criteria, such as completion of the object's sequence. If the current object has not been released, the object manager 114 waits (step 506) and retries later (step 504).

When the current object is released, step 504 advances to step 512 if the current object is a static object. In step 512, the object manager 114 frees the resources allocated to the current object (step 512), such as by unloading the current object from RAM 104. After step 512, the program 500 ends (step 514).

In contrast, if the current object is a dynamic object, the object manager 114 determines whether the handler 112 has been released (step 508). If the handler 112 has not been released, the object manager 114 waits (step 510) and retries later (step 508). When the handler is released (step 508), the object manager 114 frees the resources allocated to the current object (step 512). For instance, the object manager 114 may unload the current object and its handler from RAM 104. After step 512, the routine 500 ends (step 514).

OTHER EMBODIMENTS

While the foregoing disclosure shows a number of illustrative embodiments of the invention, it will be apparent to those skilled in the art that various changes and modifications can be made herein without departing from the scope of the invention as defined by the appended claims. Furthermore, although elements of the invention may be described or claimed in the singular, the plural is contemplated unless limitation to the singular is explicitly stated. Additionally, ordinarily skilled artisans will recognize that operational sequences must be set forth in some specific order for the purpose of explanation and claiming, but the present invention contemplates various changes beyond such specific order.

What is claimed is:

1. A method for operating a wireless communications device, comprising:
    providing a plurality of static objects each having a unique static Object ID and predefined entry point;
    providing a static object handler for correlating each static object by static Object ID and entry point;
    providing a plurality of object initiators;
    wirelessly downloading at least one dynamic object;

assigning a unique dynamic Object ID to each downloaded dynamic object;
configuring a dynamic object handler to correlate each downloaded dynamic object by dynamic Object ID;
activating at least one of said plurality of static and dynamic objects, said activating comprising:
receiving a object activation request for a requested object from one of said plurality of object initiators, the request including an Object ID;
responsive to said request,
(a) using said dynamic object handler to find a target dynamic object having a dynamic Object ID equal to the Object ID of the request;
(b) if said target dynamic object was found in step (a), identifying an entry point associated with said target dynamic object and utilizing the entry point to activate said target dynamic object as the requested object;
(c) if said target dynamic object was not found in step (a), using said static object handler to find a target static object having a static Object ID equal to the Object ID of the request; and
(d) if said target static object was found in step (c), identifying an entry point associated with said target static object and utilizing the entry point to activate said target static object as the requested object.

2. The method of claim 1, wherein said method is performed during an initialization phase of said wireless communications device.

3. The method of claim 1, wherein each object is additionally associated with an object class, and each of said static and dynamic object handlers further correlates said object class respectively with said static and dynamic objects.

4. The method of claim 3, wherein said the activation of the requested object is performed in accordance with the object class of the requested object.

5. The method of claim 1, wherein said static object handler comprises at least one of:
a static object table; and
a linked list.

6. The method of claim 1, wherein said plurality of object initiators comprise at least one of:
a user interface;
a driver; and
a master controller.

7. A machine readable medium storing a plurality of instructions, which when executed by a machine including a plurality of static objects each having a unique static Object ID and predefined entry point, a static object handler for correlating each static object by static Object ID and entry point, a dynamic object handler, and a plurality of object initiators, said plurality of instructions causing the machine to perform the steps of:
wirelessly downloading at least one dynamic object;
assigning a unique dynamic Object ID to each downloaded dynamic object;
configuring the dynamic object handler to correlate each downloaded dynamic object by dynamic Object ID;
activating at least one of said plurality of static and dynamic objects, said activating comprising:
receiving a object activation request for a requested object from one of said plurality of object initiators, the request including an Object ID;
responsive to said request,
(a) using said dynamic object handler to find a target dynamic object having a dynamic Object ID equal to the Object ID of the request;
(b) if said target dynamic object was found in step (a), identifying an entry point associated with said target dynamic object and utilizing the entry point to activate said target dynamic object as the requested object;
(c) if said target dynamic object was not found in step (a), using said static object handler to find a target static object having a static Object ID equal to the Object ID of the request; and
(d) if said target static object was found in step (c), identifying an entry point associated with said target static object and utilizing the entry point to activate said target static object as the requested object.

8. The machine readable medium of claim 7, wherein each object is additionally associated with an object class, and each of said static and dynamic object handlers further correlates said object class respectively with said static and dynamic objects.

9. The method of claim 8, wherein said the activation of the requested object is performed in accordance with the object class of the requested object.

10. A wireless telephony module, comprising:
a plurality of static objects, each static object associated with a unique Object ID and a predefined entry point;
a static object handler for correlating each static object by static Object ID and entry point;
a dynamic object handler for correlating for dynamic objects by dynamic Object ID;
a plurality of object initiators; and
an object manager;
wherein said object manager is configured to
wirelessly download at least one dynamic object, each dynamic object having a unique dynamic Object ID; and
responsive to a object activation request from one of said plurality of object initiators, said request including an Object ID,
(a) using said dynamic object handler to find a target dynamic object having a dynamic Object ID equal to the Object ID of the request;
(b) if said target dynamic object was found in step (a), identifying an entry point associated with said target dynamic object and utilizing the entry point to activate said target dynamic object as the requested object;
(c) if said target dynamic object was not found in step (a), using said static object handler to find a target static object having a static Object ID equal to the Object ID of the request; and
(d) if said target static object was found in step (c), identifying an entry point associated with said target static object and utilizing the entry point to activate said target static object as the requested object.

11. The method of claim 10, wherein each object is additionally associated with an object class, and each of said static and dynamic object handlers further correlates said object class respectively with said static and dynamic objects.

12. The method of claim 11, wherein said the activation of the requested object is performed in accordance with the object class of the requested object.

13. The method of claim 10, wherein said static object handler comprises at least one of:
   a static object table; and
   a linked list.

14. A wireless communication device, comprising:
   a speaker;
   a microphone;
   an antenna;
   a transceiver, coupled to said antenna; and
   a wireless module, coupled to said speaker, microphone, and transceiver, said wireless module further comprising:
      a plurality of static objects, each static object associated with a unique Object ID and a predefined entry point;
      a static object handler for correlating each static object by static Object ID and entry point;
      a dynamic object handler for correlating for dynamic objects by dynamic Object ID and entry point;
      a plurality of object initiators; and
      an object manager;
   wherein said object manager is configured to
   wirelessly download at least one dynamic object, each dynamic object having a unique dynamic Object ID; and
   responsive to a object activation request from one of said plurality of object initiators, said request including an Object ID,
      (a) using said dynamic object handler to find a target dynamic object having a dynamic Object ID equal to the Object ID of the request;
      (b) if said target dynamic object was found in step (a), identifying an entry point associated with said target dynamic object and utilizing the entry point to activate said target dynamic object as the requested object;
      (c) if said target dynamic object was not found in step (a), using said static object handler to find a target static object having a static Object ID equal to the Object ID of the request; and
      (d) if said target static object was found in step (c), identifying an entry point associated with said target static object and utilizing the entry point to activate said target static object as the requested object.

15. A method for operating a wireless communications device, comprising:
   providing a plurality of static objects managed by a static object manager;
   downloading at least one dynamic object to be managed by a dynamic object handler;
   wherein said plurality of static objects and said at least one dynamic object are each associated with a respective identifier;
   activating a target object selected from said plurality of static objects and said at least one dynamic object, comprising:
      (a) receiving a target identifier associated with the target object;
      (b) first searching for a dynamic object having an associated identifier matching the target identifier;
      (c) if said first searching is successful,
         activating said dynamic object as the target object;
      (d) if said first searching is not successful,
         (1) second searching for a static object having an associated identifier matching the target identifier; and
         (2) if said second searching is successful, activating said static object as the target object.

16. A machine readable medium storing a plurality of instructions, which when executed by a machine having a plurality of static objects, each of said static objects being associated with a respective identifier, causes the machine to perform the steps of:
   wirelessly downloading at least one dynamic object, each dynamic object being associated with a respective identifier; and
   activating a target object, the target object selected from one of said plurality of static objects and said at least one dynamic object, said activating comprising:
      (a) receiving a target identifier corresponding to the target object;
      (b) first searching each of said at least one dynamic object for a dynamic object having an associated identifier matching said target identifier;
      (c) if said first searching is successful,
         activating said dynamic object as the target object;
      (d) if said first searching is not successful,
         (1) second searching each of said static objects for a static object having an associated identifier matching said target identifier; and
         (2) if said second searching is successful, activating said static object as the target object.

* * * * *